UNITED STATES PATENT OFFICE.

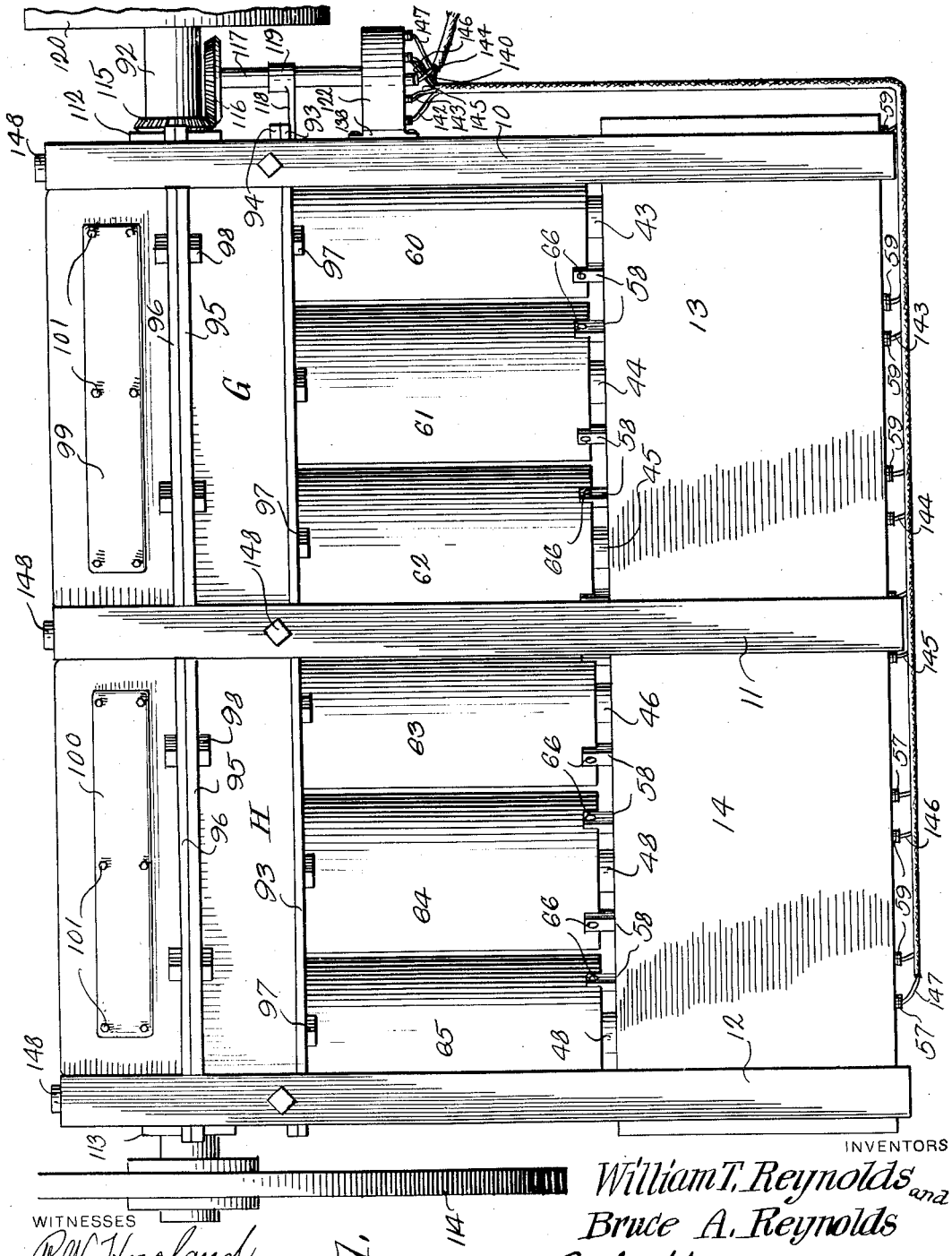

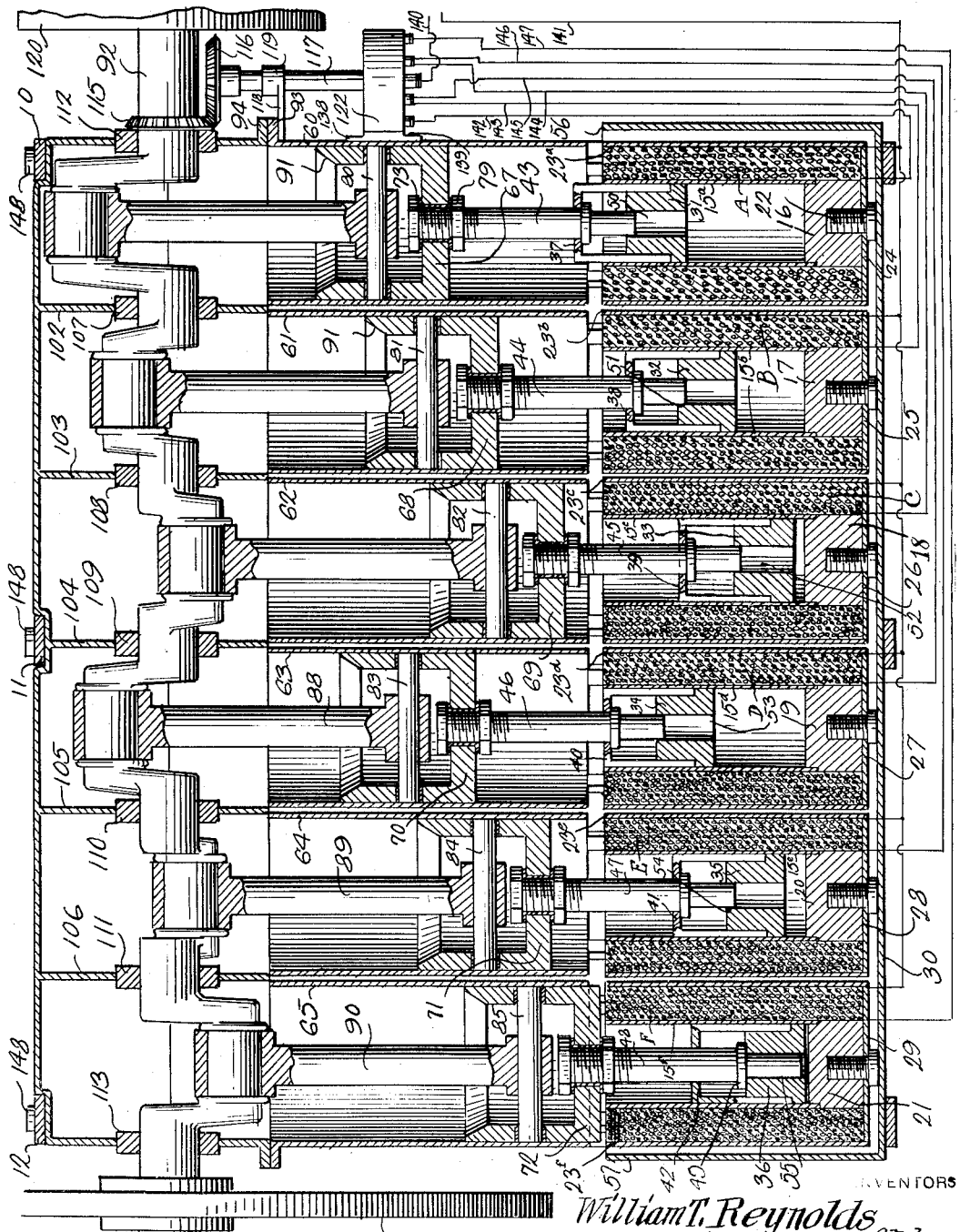

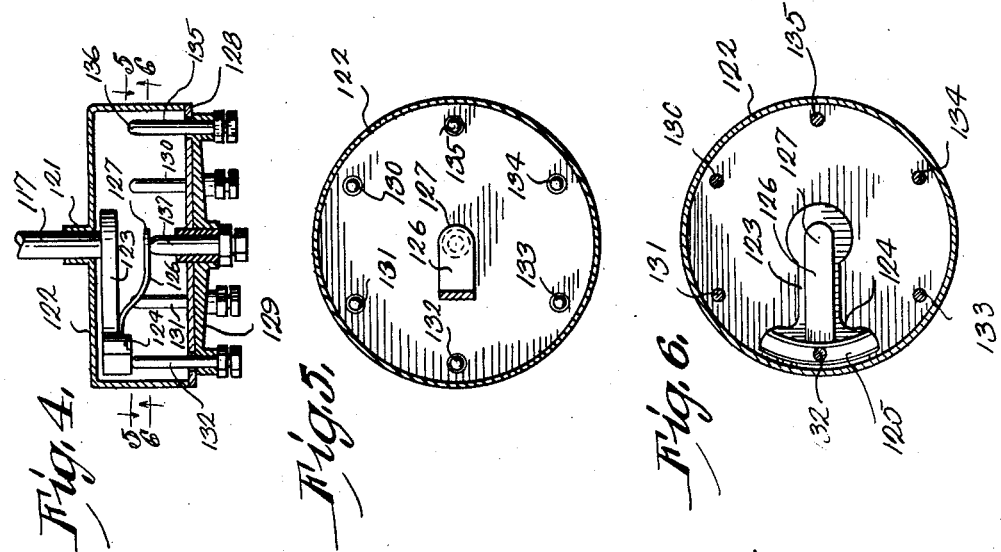

WILLIAM T. REYNOLDS AND BRUCE A. REYNOLDS, OF PORT ARTHUR, TEXAS.

DYNAMO-ELECTRIC MACHINE.

1,349,100.   Specification of Letters Patent.   Patented Aug. 10, 1920.

Application filed May 4, 1918. Serial No. 232,558.

*To all whom it may concern:*

Be it known that we, WILLIAM T. REYNOLDS and BRUCE A. REYNOLDS, citizens of the United States, residing at Port Arthur, in the county of Jefferson and State of Texas, have invented certain new and useful Improvements in Dynamo-Electric Machines, of which the following is a specification.

This invention is a dynamo electric machine, more particularly adapted for use as a motor for converting electric energy into mechanical energy capable of performing work, wherein a plurality of electro-magnets are arranged to have their cores translate rectilinear motion into rotary through an operative connection with a crank shaft and the intermittently and successively energizing and deënergizing of the magnets.

One object of the invention is to provide a plurality of solenoids whose cores are operatively connected to a crank shaft for causing the shaft to rotate.

Another object of the invention is to provide a commutator to control the energization and deënergization of the solenoids and operated from and by the crank shaft.

A further object of the invention is to provide a crank shaft whose cranks are 60° apart and in advance of the preceding one to provide an approximately continuous turning effort and torque of the shaft.

A still further object of the invention is to provide a motor that is strong and rigid in construction and effective to convert electric energy into mechanical energy capable of performing or doing work.

Broadly stated the invention comprises a series of solenoids having cores operable therein, rods connecting the cores with cross-heads, connecting rods between the cross-heads and a crank shaft, a commutator operable from and by the crank shaft to control the energization and deënergization of the solenoids through suitable circuits connecting the commutator solenoids and a series of electric energy, said commutator serving to permit the successive and intermittent energization and deënergization of the solenoids, said cranks being arranged at 60° advance from each other, a fly wheel and a driving pulley carried by the crank shaft, and a casing for holding the solenoids and for providing guides for the cross-heads and spaced bearings for the crank shaft and further serving as a means for supporting a commutator.

One practical form of construction and assembly will be described and illustrated in the accompanying drawings, in which:—

Figure 1 is a side elevation of the motor,

Fig. 2 is a longitudinal vertical sectional view through the casing,

Fig. 3 is an end elevation with the fly wheel removed,

Fig. 4 is a vertical sectional view of the commutator,

Fig. 5 is a transverse sectional view of the commutator, and

Fig. 6 is a transverse sectional view of the commutator taken on the line 6—6 of Fig. 4.

In the preferred embodiment about to be described, there is provided a casing which is composed of the vertical members 10, 11, and 12. The lower ends of these vertical members serve as supports and those maintaining the plates 13 and 14 spaced from the ground or other support. In the space inclosed by the plates 13 and 14 there is mounted a plurality of solenoids that are preferably arranged in longitudinal alinement so that their longitudinal axes are vertical. These solenoids indicated at A, B, C, D, E, and F, have their windings mounted upon thin brass sleeves $15^a$, $15^b$, $15^c$, $15^d$, $15^e$, and $15^f$.

To coöperate with the ends of the sleeves there are provided the soft iron cores 16, 17, 18, 19, 20, and 21. These cores are provided with a shoulder adjacent one end so that their periphery will be flush with the periphery of the sleeves and thus form a smooth winding space for the wire of the winding of the solenoids A to F inclusive.

The cores 16 to 21 inclusive are provided centrally with a threaded hole that is adapted to receive a screw 22. Each one of these soft iron cores is similarly provided to receive a screw. The windings of the solenoids are inclosed in a suitable manner by means of the cover sleeves $23^a$, $23^b$, $23^c$, $23^d$, $23^e$, and $23^f$. As shown these cover sleeves are arranged to more or less snugly inclose the windings in order to prevent any disarrangement of the convolutions of wire, Their lower ends are closed by means of the cover plates 24, 25, 26, 27, 28, and 29.

The cover sleeves and cover plates are preferably of soft steel of sufficient thickness to concentrate the lines of magnetic flux.

These cover plates are provided with suitable holes so that the screws 22 may pass therethrough and be engaged with the soft iron cores 16 to 21 inclusive. As shown the heads of the screws 22 are flat and rest upon the bottom wall 30 of the casing inclosing the solenoids. Owing to the fact that the inner sleeves 15$^a$ to 15$^f$ are of non-magnetic material, there is no side attraction on the movable core or plunger. If they were of steel there would be a side attraction, which would materially interfere with the working of the machine. Again, the core or plunger must not fit tight in these sleeves, for there must be sufficient space to allow the air to pass freely out and in as the plunger passes up and down, to avoid a vacuum, or compressed air. The cores 31 to 36 inclusive are secured to suitable carrying members indicated at 37, 38, 39, 40, 41, and 42.

As shown these carrying members may be cylindrical and have a cup-like formation and the cores 31 to 36 inclusive may be provided with reduced sections so that the outside circumference will be flush with the circumference of the carrying members 37 to 42 inclusive. These carrying members 37 to 42 inclusive are provided centrally with a hole so that the piston rods 43, 44, 45, 46, 47, and 48 will pass therethrough.

The piston rods 43 to 48 inclusive may be provided with collars as indicated at 49 to engage with the under surface of each one of the holding members 37 to 42 inclusive. The piston rods preferably project into the holding members a sufficient distance so that they may be engaged with the cores 31 to 36 inclusive for supporting the same.

If desired the carrying members 37 to 42 inclusive may be arranged for a loose connection with the piston rods 43 to 48 inclusive so that any binding or sticking of the carrying members 37 to 42 inclusive will not prevent the downward movement of the piston rods. In order to provide for this the cores 31 to 36 inclusive are provided with holes 50 to 55 giving sufficient clearance for the reduced ends of the piston rods 43 to 48 inclusive. The provision of this loose connection will also tend to provide for imparting a better pull upon the cores 31 to 36 when the solenoids A to F inclusive are energized.

The side plates 13 and 14 preferably connect with the bottom wall 30 and with the end walls 56 and 57. The upper ends of the side walls 13 and 14 and the end walls 56 and 57 are preferably so arranged that suitable supporting members 58 may be secured thereto. If desired a cover may be employed. If such a cover is used it should be provided with sufficiently large holes to provide for the passage of the carrying members 37 to 42 inclusive during their linear motion.

The bottom wall 30 and the bottom cover plates 24 to 29 inclusive are provided with suitable bushed holes that are preferably in alinement so that the wires leading from the terminals of the windings of the solenoids A to F inclusive may be passed outward and insulated from the several cover plates and the bottom wall, the bushings being generally shown in Fig. 1 and indicated at 59.

The supporting members 58 serve to support the cylindrical guide members 60, 61, 62, 63, 64, and 65. The supporting members are preferably provided with shouldered portions to receive the bottom ends of these cylindrical guide members and are secured thereto by suitable fastening means such as the bolts 66.

These supporting members 58 preferably space the cylindrical guide members 60 to 65 inclusive above the ends of the solenoids A to F inclusive as shown in Figs. 1 and 2. These cylindrical guide members 60 to 65 serve as guides and bearings for the cross-heads generally indicated at 67, 68, 69, 70, 71, and 72. One end of each of these cross-heads is divided with a central opening through which passes the threaded ends 73, 74, 75, 76, 77, and 78 of the piston rods 43 to 48 inclusive.

To hold the piston rods in proper relation to the cross-heads the nuts 79 are employed. One of the nuts is placed within the cross-head and the other exterior of the cross-head so as to clamp the end of said cross-head therebetween the nuts, then each locking and retaining the piston rod in its proper position.

The cross-heads 67 to 72 inclusive are preferably provided with transverse alining holes that are adapted to receive the piston pins 80, 81, 82, 83, 84, and 85. The piston pins 80 to 85 inclusive are adapted to coöperate with the small ends of the connecting rods 86, 87, 88, 89, and 90 and these pins then serve as wrist pins. The pins may be rotatably mounted in suitable bushings in the transverse holes if desired.

The pins, if rotatably mounted, are then preferably secured to the small end of the connecting rod. If the pins are secured in their respective holes, then the small end of the connecting rod should be rotatably connected with said pins. In order to provide for sufficient movement of the connecting rods with respect to their several cross-heads the cross-heads should have open ends and this open end should be chamfered as indicated at 91.

These cross heads are preferably so constructed that they provide a long bearing contact with the internal walls of the cylindrical guide members 60 to 65 inclusive. The large ends of the connecting rods 80 to 86 are preferably connected with a crank shaft and in the present disclosure there are six connecting rods and therefore six cranks or cranked portions of the crank shaft 92.

The cranks are preferably arranged 60° apart to provide for an approximately continuous turning effort being imparted to the crank shaft so that the torque of the shaft will be approximately continuous. The cylindrical guide members 60 to 65 are provided at their upper ends with a flange 93. This flange 93 is adapted to coöperate with the flange 94 that is formed upon the lower half of the crank cases G and H. These crank cases are preferably arranged to be divided horizontally and for this purpose the upper side of the lower half has a flange 95 adapted to coöperate with the flange 96 carried by the lower portion of the upper half of the crank case.

To secure the flanges 93 and 94 together the bolts 97 may be employed. To hold the two sections of the crank cases together the bolts 98 may be employed. The upper section of each portion of the crank cases may be provided with a rectangular hand hole that is covered by means of the hand hole plate 99 and 100. These hand hole plates may be secured in position by means of the bolts 101 as shown.

The crank cases G and H may be provided interiorly with suitable division walls indicated at 102, 103, 104, 105, and 106. These division walls preferably extend vertically and transversely of the cases. They are provided, intermediate their ends, with suitable holes that are adapted to form the bearings shown at 107, 108, 109, 110, and 111. The end walls are similarly provided with holes forming the bearings 112 and 113. These several bearings serve to support the crank shaft 92, the bearings 107 to 111 inclusive are adapted to coöperate with bearing portions formed on the crank shaft and between the webs of the several cranked portions.

At the left hand end in Fig. 2 there is provided a fly wheel 114 that may have a boss that is secured to the crank shaft in any usual or customary manner. To provide for the attachment of this fly wheel, the crank shaft extends through the bearing 113 a sufficient distance.

The rim of this fly wheel may be of such weight as is sufficient for the device when in operation. The size and weight of the rim may vary according to the amount of energy that is desired to store therein. The opposite end of the crank shaft 92 projects through the bearing 112 and has mounted thereon a gear 115 that is adapted to mesh with the gear 116. The gear 116 is preferably mounted upon a vertical shaft 117.

To support the shaft 117 there is provided a bracket 118 having a bearing portion 119. The bracket 118 may be secured to the flange 93 by means of one of the fastening bolts 97. The outer end of the shaft 92 may be provided with a suitable driving pulley indicated at 120. The pulley may be secured to the shaft in any workman-like manner.

The lower end of the shaft 117 passes through a bearing 121 formed in the commutator casing indicated at 122. The lower end of the shaft 117, where it projects inside of the casing 122, may be provided with the arm 123 which is secured to the shaft in any suitable manner. The outer end of the arm 123 is provided with a segmental portion 124 in which is formed an arcuate groove 125.

The grooved portion of the segment 124 is preferably thicker than the arm 123. At a suitable point on the segment 124 there is provided and secured a contact spring arm 126. This contact spring arm projects toward the center of the casing and is bent outward from the arm 123 so that its free end 127 lies in a plane parallel with the arm 123. The casing 122 is provided with a removable cover plate 128 which plate is provided with a series of holes spaced adjacent the periphery.

The holes are adapted to receive suitable bushings that are formed upon the underside of a terminal carrying plate 129. This terminal plate is provided with suitable bosses so that pins 130, 131, 132, 133, 134, and 135 may be passed therethrough and retained therein. These terminals pass through the bosses and bushings and project into the interior of the commutator casing 122. The upper ends of the pins 130 to 135 inclusive are rounded as indicated at 136.

The pins are so arranged around the cover plate that when the shaft 117 rotates the arm 123, the groove 125, will successively engage with each one of the pins. The pins thus serve as terminals or contacts for completing the circuit.

The insulated cover 129 is further provided centrally with a hole having an insulating bushing passing therethrough that projects through the cover plate 128. The bushing serves to accommodate the pin 137. This pin has a rounded upper end that is adapted to coöperate with the free end 127 of the spring arm 126. The outer ends of the pins 130 to 135 inclusive are provided with suitable means that will provide for attaching the circuit wires thereto.

The pin 137 is also provided at its other end with suitable circuit connecting means. Thus it will be seen that all of the terminals may be employed for connecting circuit wires. The commutator casing 122 may be provided with a suitable foot 138 having holes therein through which are adapted to pass suitable fastening bolts 139. The terminal for the pin 137 is adapted to be connected with a suitable source of electric energy (not shown) by means of a circuit wire 140. The other circuit wire 141 leading from the source of energy is connected to one terminal of each of the windings of these solenoids, A to F inclusive.

The wire 141 thus serves as a common conductor or return for the several solenoids. The pin 132 and its terminal has connected thereto a conductor 142 that connects with the free terminal of the solenoid A. The pin 131 and its terminal has a conductor 145 connected thereto that connects with the free terminal of the solenoid D. The pin 130 and its terminal has connected thereto a conductor 146 leading to the free terminal of the solenoid E.

The pin 135 and its terminal has connected to it a conductor 147 that connects with the free terminal of the solenoid F. The pin 134 has connected to it a conductor 144 that leads to the free terminal of the solenoid C. The pin 133 and its terminal has connected thereto a conductor 143 leading to the free terminal of the solenoid B. As the shaft 92 rotates it will cause the gear 115 to mesh with the gear 116 and thereby rotate the shaft 117.

As the shaft 117 rotates it causes the arm 123 to intermittently and successively engage with the rounded ends 136 of the pins 130 to 135 inclusive. As the groove 125 formed in the segmental portion 124 engages with and rides over the rounded ends 136 the circuit will be completed to one of the solenoids. As each one of the pins is successively engaged the circuit will be complete therethrough and the length of time that the circuit will be closed will be that depending the length of the arcuate groove 125. As shown it is preferred to energize the solenoids A to F inclusive in a successive manner so that their movable cores will produce a substantially continuous turning effort of the shaft 92.

This should produce a substantially continuous torque of the shaft. The vertical members 10, 11, and 12 are so formed that their lower sides or supporting portions form a wide base for the motor. The sides of these vertical members converge toward each other vertically and their upper portions are so formed that they will receive the crank cases G and H. In order to hold these crank cases in their proper position the bolts 148 are employed.

What is claimed is:—

1. An electric motor comprising a plurality of solenoids, a crank shaft, piston rods connected to the crank shaft, a core slidably mounted on each piston rod and operable in a solenoid, means for limiting the movement of the cores, and computating means operable by the crank shaft for energizing and deënergizing the solenoids.

2. An electric motor comprising a plurality of solenoids, a crank shaft, piston rods connected to the crank shaft a collar formed on each piston rod, a core slidably mounted on each piston rod and adapted to engage the collar on said piston rod, and operable in an alining solenoid, and commutating means operable by the crank shaft for energizing and deënergizing the solenoids.

3. An electric motor, which comprises a plurality of solenoids arranged side-by-side, a crank shaft, a connecting rod for each crank thereof, a cross-head and a guide therefor connected to the rod, a piston rod connected to each cross-head, a core operable in each solenoid and loosely connected to the piston rod, and commutating means operable by the crank shaft for energizing and deënergizing the solenoids.

4. An electric motor, which comprises a plurality of solenoids, a guide sleeve in each solenoid, core operable in the sleeve, means loosely connected to the core and operable within the sleeve, a piston rod connected to the means, cross-head guide-ways mounted in a spaced relation for each solenoid, a cross-head for each guide-way and connected to the rod, a rotatably mounted crank-shaft, a connecting-rod connected to each cross-head and to a crank, and means for energizing and deënergizing the solenoids for producing a rotary motion in the crank-shaft.

5. An electric motor, which comprises a plurality of solenoids, cores loosely mounted and operable within the solenoids, a crank-shaft, means connected with the crank-shaft and carrying the cores, guides for said means, a casing for the solenoids, a plurality of spaced vertical members serving as supports for the solenoid casing and for the guides, a split crank-case having bearings therein for the shaft, said crank-case being carried by the outer ends of the guides and mounted between the vertical members, means for securing the case to the members, said members converging from their lower supporting portions to said crank case, and means for energizing and deënergizing each of the solenoids.

6. An electric motor, which comprises a solenoid, a winding therefor including terminals, a source of electric energy including an electric circuit connected to the terminals, means in the circuit for making and breaking the circuit, a fixed guide sleeve in each solenoid, a piston operable in each sleeve, a piston rod connected to the piston and having one end projecting therethrough, said rod having a collar thereon, a core loosely mounted on the projecting portion of the piston rod and operably connected by a hole for receiving the piston rod and the collar, a cylindrical cross-head guide spaced from and in alinement with the solenoid, a cross-head operable in the guide having connected thereto one end of the piston rod, a crank-shaft, a connecting rod connecting the shaft and the cross-head, means operable from the shaft for actuating the circuit making and breaking means.

In testimony whereof we affix our signatures in presence of two witnesses.

WILLIAM T. REYNOLDS.
BRUCE A. REYNOLDS.

Witnesses:
ED RAYFORD,
W. J. LEINEN.

Witnesses to William T. Reynolds:
W. NANCE,
W. T. GREEN.